US005191339A

United States Patent [19]

Riza

[11] Patent Number: 5,191,339

[45] Date of Patent: Mar. 2, 1993

[54] PHASED-ARRAY ANTENNA CONTROLLER

[75] Inventor: Nabeel A. Riza, Clifton Park, N.Y.

[73] Assignee: General Electric Company, Schenectady, N.Y.

[21] Appl. No.: 847,155

[22] Filed: Mar. 5, 1992

[51] Int. Cl.$^5$ ....................... H01Q 3/22; G02B 27/10; G02B 27/46

[52] U.S. Cl. .................................... 342/372; 342/368; 359/238; 359/285

[58] Field of Search ................ 342/368, 372; 359/238, 359/285, 349, 578, 583, 287

[56] References Cited

U.S. PATENT DOCUMENTS

| | | | |
|---|---|---|---|
| 3,878,520 | 4/1975 | Wright | 342/368 |
| 4,864,312 | 9/1989 | Huignard et al. | 342/368 |
| 4,929,956 | 5/1990 | Lee et al. | 342/376 |
| 4,962,382 | 10/1990 | Lee | 359/285 |
| 5,032,002 | 7/1991 | Fonneland | 359/238 |

OTHER PUBLICATIONS

"Acousto-Optic Control of Phased-Array Antennas", N. A. Riza, May 1990, GE Technical Information Series.

*Primary Examiner*—Gregory C. Issing
*Attorney, Agent, or Firm*—Donald S. Ingraham; Marvin Snyder

[57] ABSTRACT

A compact, liquid crystal-based acousto-optical control system for large (>1000 elements) phase-based phased array antennas includes a laser source providing polarized laser beams processed in an in-line interferometric optical architecture that uses two acousto-optic deflectors (AODs) driven by a microwave signal that preferably has a frequency of one-half the desired radar carrier frequency. The AODs and associated polarization rotators generate a plurality of optical signal pairs, each pair having one positive and one negative first order doppler shifted light beam, the positive and negative doppler shifted beams being orthogonally linearly polarized. A phase delay is introduced in a predetermined one of the light beams in each optical signal pair via electrical control of an array of birefringent-mode nematic liquid crystal cells in a spatial light modulator (SLM), while the non-phase delayed light beam in each pair serves as a reference for interferometric detection. After passing through the SLM, the phase-delayed light beam is combined with the unshifted light beam via a 45 degree orientation polarizer; this signal is then used via heterodyne detection by a photodiode to generate the radar carrier with the appropriate phase shift. The system operates in both the antenna transmit and receive modes, and provides a wide (GHz) tunable bandwidth, intrapulse beamforming, and analog phase control.

25 Claims, 3 Drawing Sheets

PHASED-ARRAY ANTENNA CONTROLLER

RELATED APPLICATIONS

This application is related to the application of N. Riza entitled "A Compact Wide Tunable Bandwidth Phased Array Antenna Controller," Ser. No. 07/847,156 allowed Sep. 14, 1992, filed concurrently with this application and assigned to the assignee of the present application, which related application is incorporated herein by reference.

BACKGROUND OF THE INVENTION

This invention relates generally to signal processing systems and more particularly to beamforming controls for phased array antenna systems.

Phased array antenna systems employ a plurality of individual antennas or subarrays of antennas that are separately excited to cumulatively produce a transmitted electromagnetic wave that is highly directional. The radiated energy from each of the individual antenna elements or subarrays is of a different phase, respectively, so that an equiphase beam front, or the cumulative wave front of electromagnetic energy radiating from all of the antenna elements in the array, travels in a selected direction. The difference in phase or timing between the antenna activating signals determines the direction in which the cumulative beam from all of the individual antenna elements is transmitted. Analysis of the phases of return beams of electromagnetic energy detected by the individual antennas in the array similarly allows determination of the direction from which a return beam arrives.

Beamforming, or the adjustment of the relative phase of the actuating signals for the individual antennas (or subarrays of antennas), can be accomplished by electronically shifting the phases of the actuating signals or by introducing a time delay in the different actuating signals to sequentially excite the antenna elements to generate the desired direction of beam transmission from the antenna. Most present-day phased array radars use modulo $2\pi$ antenna beamforming called phase-based beam control. This kind of beamforming limits the radar instantaneous bandwidths to approximately 1–2% of the radar carrier frequency. Nevertheless, this narrowband phase-based beamforming is used in nearly all operational phased array radars today.

Modulo $2\pi$ electronic shifting of phases of antenna element actuating signals requires extensive equipment, including switching devices (e.g. PIN diodes) to route the electrical signals through appropriate hardwired circuits to achieve the desired phase changes. Electronic or microwave phase shifters are designed for use at a specific frequency, i.e., the chosen radar carrier frequency, and thus have numerous drawbacks when employed in phased array antenna systems using broadband radiation or wide tunable bandwidths for implementing intrapulse beamforming. For example, most hardwired electronic phase shifters are limited to frequency changes of about 5% of the design frequency. The digital phase control microwave phase shifters also provide only a finite set of phase values; for example, a 6 bit phase shifter generates only 64 possible phase shifts.

Present day phase-based electronically controlled phased array radar antenna systems are relatively large, heavy, complex, and expensive systems. These electronic systems require a large number of microwave components such as phase shifters, power splitters, and waveguides to form the antenna control system. This arrangement results in a system with a narrow tunable bandwidth that is relatively lossy, electromagnetically sensitive, and very hardware intensive. In addition, many phased array antenna systems/radars use mechanical scanning in azimuth, with electronic scanning in height. The mechanical scanning systems are typically large, heavy, and slow.

Ideally, a phased array antenna control system should be light, compact, relatively immune to undesirable electromagnetic radiation, and straight-forward to fabricate, operate, and maintain. Such a system also desirably has a wide antenna tunable bandwidth, and inertialess, motion-free high resolution beam scanning ability with application-dependent slow-to-fast scanning speeds. The wide tunable bandwidth provides the radar with a "frequency hopping" capability that makes it difficult to jam or detect. It is additionally advantageous to have an analog beamforming control system that allows a large number of possible phase shift combinations. Such an analog system is in contrast to digital phase control from microwave phase shifters, which phase control provides a fixed number of possible phase actuation signals. This limited number of possible actuation signals in turn limits the phase resolution achievable with the microwave devices, thus limiting the angular resolution of the scanned antenna beam. Further, in conventional electronically controlled phased arrays, the digital microwave phase shifters are also typically used for correcting phase errors that result due to the other microwave devices in the system. Because of the digital nature of the phase shifters, the phase errors can only be partially cancelled. With the liquid crystal (LC) analog phase control, these phase errors can be completely cancelled.

Optical control systems can be advantageously used to generate control signals for phased array antennas. For example, an optical control system for generating differentially time-delayed optical control systems is presented in the copending applications of N. Riza entitled "Reversible Time Delay Beamforming Optical Architecture for Phased Array Antennas," Ser. No. 07/690,421, filed Apr. 24, 1991, allowed Dec. 18, 1991; and "Time-Multiplexed Phased Array Antenna Beam Switching System," Ser. No. 07/826,501, filed Jan. 27, 1992. Both of these copending applications are assigned to the assignee of the present invention and are incorporated herein by reference.

Liquid crystal devices are advantageously used in such phased array antenna optical control systems to selectively adjust the polarization of light beams used in the signal processing. Large size liquid crystal (LC) arrays have been successfully employed in a number of applications, including flat panel projection displays, high definition television, and aircraft cockpit displays. These LC displays typically use nematic liquid crystals, which have relatively high (0.2) optical birefringence and which are readily controlled by small (e.g., 5 volts) electrical signals. Nematic LCs have been used to make commercial displays having a large area and a large number of pixels (e.g., $>$one million pixels) at an acceptably low cost using thin-film transistor (TFT) electrical addressing circuits. The size (number of pixels and area of the array) of a two-dimensional (2-D) LC array is an important consideration in choosing the LC type that will provide the highest performance at an acceptable cost. For example, in a state of the art four-faced phased array radar system currently in production, each of the four faces of the antenna has 4400 elements. Thus, to separately control each antenna element using an optical signal control system with a liquid crystal array requires 4400 switching LC elements per 2-D array. Nematic LC's are readily fabricated in large arrays and a number of effective thin-film transistor-based LC addressing techniques have been developed for driving LC pixels in such an array with 5 V video signals. In addition, nematic LCs have shown as good as 4000:1 on/off ratios. As described in the co-pending application Ser. No. 07/826,501, filed Jan. 27, 1992, cited above, time multiplexing techniques can be efficaciously used to provide a nematic liquid crystal based optical control system that has minimal dead times between respective transmit/receive sequences, and nearly 200 beams/second antenna scanning speeds.

It is accordingly an object of this invention to provide a liquid crystal based electrooptic processor that can generate analog phase-based modulo $2\pi$ phased array antenna beam control.

It is a further object of this invention to provide a phase-based antenna controller that is relatively compact, lightweight and has an inertialess beam scanning structure.

Another object of this invention to provide a phase-based antenna controller that can provide an antenna controller that has a wide (i.e., in the GHz range) tunable antenna bandwidth with stable phase-control and an independent, analog, phase-error calibration capability for all the elements in the array.

A further object of the present invention is to provide an optical beam switching technique that has low optical losses, low inter-channel crosstalk, and that is readily fabricated for use with a relatively large (e.g., >1000) number of phased array antenna elements.

SUMMARY OF THE INVENTION

In accordance with the present invention, an optical signal control system generates differentially phase-shifted light beam pairs that control the relative phase of microwave signals governing the transmit and receive electromagnetic radiation patterns of a phased array antenna. The optical control system comprises a source of coherent, linearly polarized light coupled to an acousto-optic control system for generating a plurality of optical signal pairs, an optical phase modulating device, and a transceiver module having a heterodyne detection device to detect the relative phase shift between light beams in an optical signal pair.

Each optical signal pair comprises two light beams, one of which has a negative first order doppler shift and one of which has a positive first order doppler shift. The acousto optic control system includes a first and a second acousto-optic deflector (AOD), both of which are driven by a common microwave signal; a 1:1 imaging system through which light beams emanating from the first to the second AOD pass; and a 90° polarization rotator. The light source and an associated lens are disposed so that light beams are incident at the Bragg angle of the first AOD (i.e., the light beams are "Bragg matched" to the AOD), resulting in some of the incident beams passing through undiffracted and some of the beams being diffracted and undergoing a positive first order doppler shift. The amount of the doppler shift is determined by the frequency of a microwave signal driving the AOD. The polarization rotator is disposed at the focal point between imaging lenses in the 1:1 imaging system so that the undiffracted light beams pass therethrough and emerge having a linear polarization orthogonal to that of the positive first order doppler shifted light beams. The 1:1 imaging system is further disposed so that the polarization-rotated light beams are incident on the second AOD at the Bragg angle such that they are diffracted and undergo a negative first order doppler shift, and emerge paired with the positive first order doppler shifted beams, the majority of which pass through the second AOD essentially undiffracted. Corresponding ones of the positive and negative first order doppler shifted beams form a plurality of optical signal pairs.

The optical phase modulating device comprises a two-dimensional array of liquid crystal devices disposed so that optical signal pairs passing from the acousto-optic control system pass respective ones of the liquid crystal pixels. The pixels are electrically controlled to selectively shift the phase of one of the light beams (having a predetermined linear polarization) in each of the optical pairs while the light beam of the opposite polarization in the optical signal pair passes without undergoing a voltage-dependent phase shift.

The transceiver module is optically coupled to the optical phase modulating device to receive the plurality of processed optical signal pairs. The heterodyne detection device is disposed to detect the interference between the phase of the positive and the negative first order doppler shifted light beams in each optical signal pair. The heterodyne detection device advantageously is a two-dimensional photodiode array which detects the interference in each optical signal pair and generates a corresponding electrical beamforming signal. Each of the electrical beamforming signals corresponds to a respective antenna element. The photodiode array is typically electrically coupled through transmit/receive circuitry to control the scanned electromagnetic radiation pattern in both the transmit and receive modes of a phased array antenna.

A method of processing optical signals to control a phased array antenna in accordance with this invention includes the steps of passing a plurality of coherent, linearly polarized light beams through an acousto-optic controller to generate a plurality of optical signal pairs, each of the pairs having two light beams respectively having a positive and negative first order doppler shift; selectively shifting the phase of a predetermined one of the light beams in each of the optical signal pairs; detecting the interference between the relative phases of the two light beams in the optical signal pair and generating a corresponding electrical beamforming signal; and controlling the transmit and receive electromagnetic radiation patterns of the phased array antenna using the electrical beamforming signals.

BRIEF DESCRIPTION OF THE DRAWINGS

The features of the invention believed to be novel are set forth in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE PREFERRED EMBODIMENT

Figure 1:
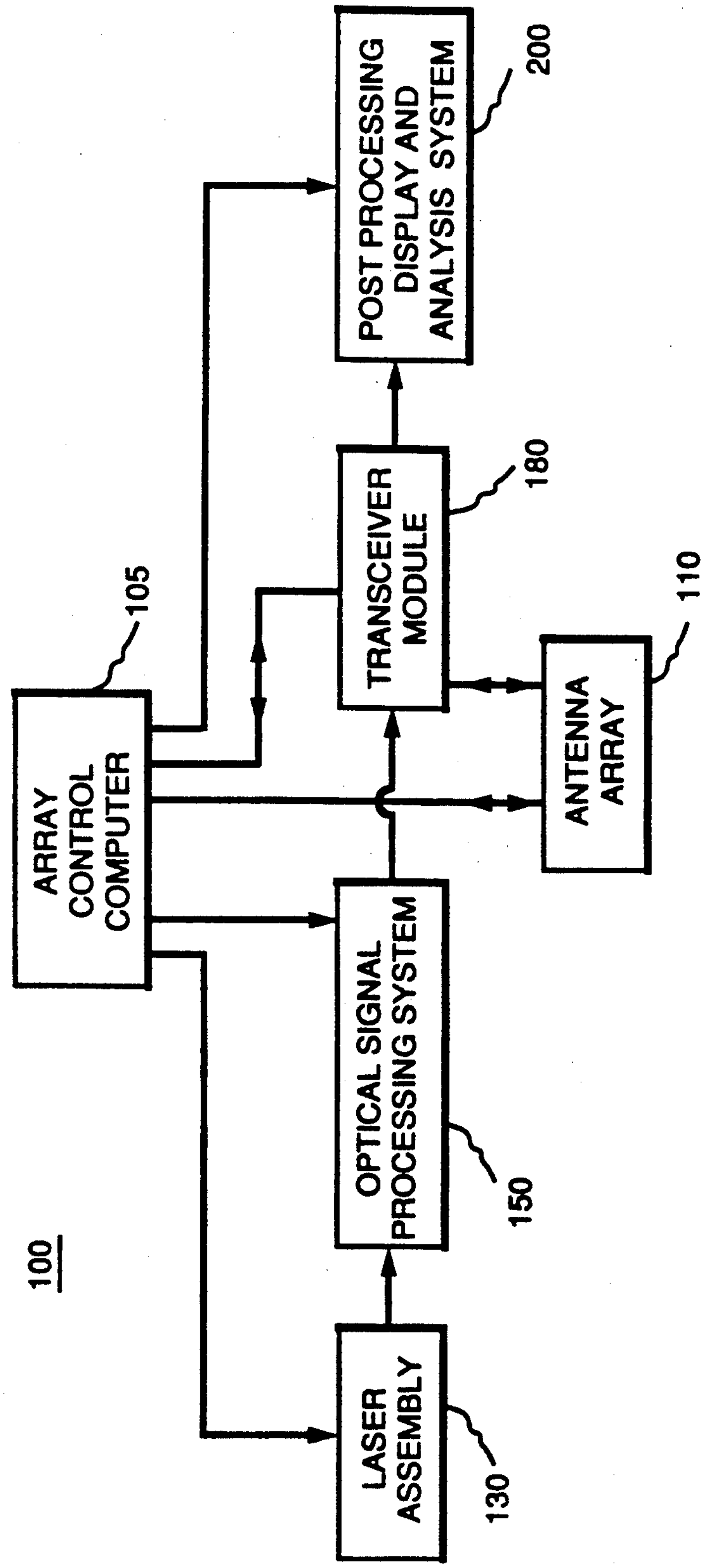
FIG. 1 is a block diagram of a phased array antenna system in which the present invention is employed.

In FIG. 1, a phased array antenna system 100 used in a radar system or the like comprises an array control computer 105, an antenna array 110, a laser assembly 130, an optical signal processing system 150, a transceiver module 180 and a post-processing system 200 for display and analysis. Array control computer 105 is coupled to and generates signals to control and synchronize the operation, described below, of the components listed above so that optical signal processing system 150 generates optical signals to control the transmit and receive electromagnetic radiation patterns of antenna system.

FIG. 2 illustrates in greater detail certain components of phased array antenna system 100 of FIG. 1. When the system operates in the transmit mode, electromagnetic energy is radiated into free space by antenna array 110, which typically comprises a plurality of antenna elements (not shown). The antenna elements are similarly used to detect electromagnetic energy and generate corresponding electrical signals. As used herein, an antenna element may comprise one or more radiating devices (not shown), which, when excited by an electrical signal, radiate electromagnetic energy into free space. In a phased array system, the number and arrangement of the antenna elements are determined by the desired beamforming and detection capabilities for the array. For example, in a typical advanced phased array radar system used for target tracking, each face of a four-faced array comprises about 1,000 antenna elements.

Antenna array 110 is coupled to signal processing system 150 via a transceiver module 180, and a transmit fiber optic array link 171. Transceiver module 180 is controlled by array control computer 105 (shown in FIG. 1) to select a transmit or a receive mode of operation for phased array antenna system 100. In the transmit mode, optical signals from signal processing system 150 are converted to electrical beamforming signals in transceiver module 180, which signals are used to drive the antenna elements to radiate electromagnetic energy into free space. In the receive mode, transceiver module 180 couples return electrical signals corresponding to the electromagnetic energy detected by the antenna elements to the electrical signals derived from signal processing system 150 to mix the signals and thereby generate respective in-phase signals to be added and then directed to the post processing system 200 for display and analysis.

Figure 2A:
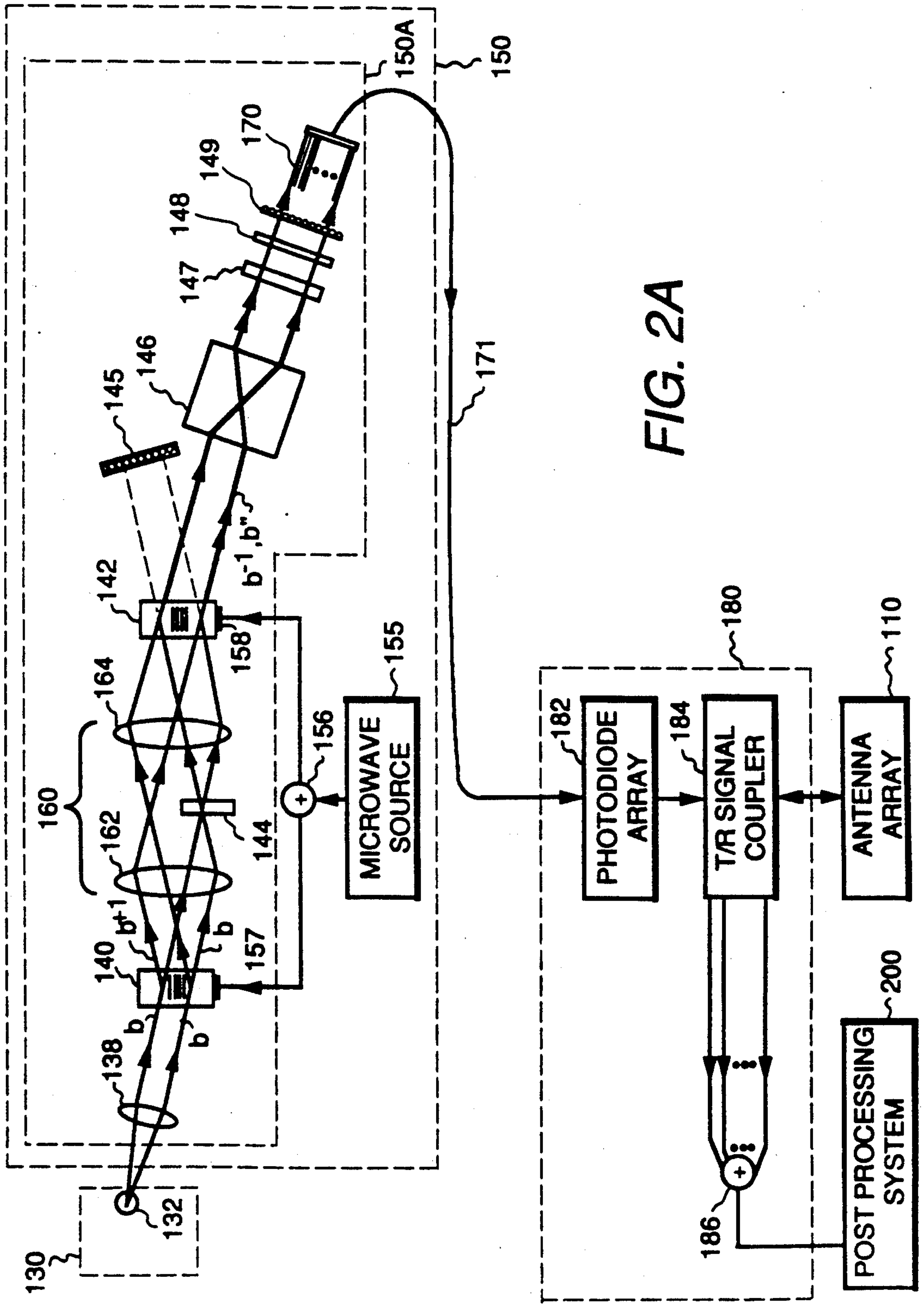
FIG. 2A is a part block and part schematic representation of a phased array antenna system including an optical signal control system of the present invention.

As illustrated in FIG. 2A, optical signal processing system 150 comprises optical architecture 150A to generate the phase shifts in the drive signals for antenna array 110. As used herein, "optical architecture" refers to the combination of devices for manipulating the direction, diffraction, polarization, or the phase or amplitude of the light beams.

Laser assembly 130 is coupled to optical signal processing system 150 and generates linearly polarized coherent light beams. These light beams provide the input signal to the optical architecture of signal processing system 150 and are processed to generate the drive signals for antenna array 110. For the purpose of describing the present invention, it will be assumed that laser assembly 130 generates "p" polarized, i.e., vertically polarized light beams, although "s" polarized, i.e., horizontally polarized, light beams may similarly be used with appropriate adjustments in the optical architecture. Laser assembly 130 comprises a laser source 132, which is advantageously a semiconductor laser, but may be any type of laser beam generator that can provide beam intensities sufficient for operation of the optical signal processing system as described in this application. Laser source 132 is typically biased to generate continuous wave radiation, although it can alternatively be intensity modulated at the pulse repetition frequency (PRF) of the radar system.

Laser source 132 is optically coupled to a spherical lens 138 disposed so that it acts as an optical collimator to cause light beams passing from it to travel in a parallel path. In FIG. 2, two representative light beams "b" emanating from lens 138 are illustrated. Spherical lens 138 is optically coupled to a first acousto-optic deflector (AOD) 140. First AOD 140 is a Bragg cell, i.e., a device in which some number of light beams striking the device from a predetermined angle (Bragg angle) pass through the device undiffracted and some number are selectively diffracted and are doppler shifted dependent on the acoustic signal driving the crystals within the Bragg cell. First AOD 140 comprises a transducer 157 that is electrically coupled to a microwave source 155 that provides the acoustic drive signal to transducer via a microwave splitter 156. First AOD is disposed with respect to spherical lens 138 so that p-polarized collimated light beams "b" emanating from lens 138 are Bragg matched to first AOD 140. First AOD is positioned to receive the light beams "b" from lens 138 and to pass a number of undeflected, p-polarized, undiffracted light beams "b" and a number of angularly deflected, i.e., diffracted, doppler-shifted light beams denoted in FIG. 2 as "$b^{+1}$". First AOD 140 causes a +1, i.e. a positive first order, doppler shift in the diffracted light beams "$b^{+1}$". The positive doppler shift in the deflected p-beam is equal to the microwave frequency that drives first AOD 140. In a typical arrangement, about 90% of the light beams entering first AOD 140 pass through the device undiffracted (known as DC light beams) and the remainder are diffracted.

First AOD 140 is optically coupled to a 1:1 imaging system 160, which in turn is coupled to a second AOD 142. Imaging system 160 comprises a first imaging lens 162 and a second imaging lens 164, which are disposed so that the "b" and the "$b^{+1}$" light beams passing from first AOD 140 to second AOD 142 go through the imaging system and are incident at the Bragg angle on second AOD 142. A 90 degree polarization rotator 144 (e.g., a half wave plate) is disposed between first and second imaging lenses 162, 164 so that the undiffracted "b" light beams exiting from first imaging lens 162 enter polarization rotator 144 and undergo a polarization shift from p-polarized light to s-polarized light (i.e., the p and s light beams are orthogonally polarized). The s-polarized "b" light beams then pass into second imaging lens 164, which is positioned so that the light beams are deflected to be Bragg matched (i.e., incident at the Bragg angle) to second AOD 142.

Second AOD 142 is a device similar to first AOD 140 and comprises a transducer 158 which is electrically coupled to microwave source 155 via microwave splitter 156 so that second AOD 142 is driven by the same microwave signal as first AOD 140. Second AOD 142 and its associated transducer 158 are oriented in the optical architecture so that the s-polarized "b" light beams that are diffracted in second AOD 142 experience a −1, or negative first order, doppler shift. These diffracted, negative doppler shifted light beams are indicated in FIG. 2 by the designation "$b^{-1}$". A light absorber 145 is optically coupled to second AOD 142 and disposed so that the "b" light beams that pass through second AOD 142 undiffracted are absorbed by light absorber 145. The first order positive doppler shifted "$b^{+1}$" light beams (which are p-polarized) pass through imaging system 160 so that the majority of these light beams pass through second AOD 142 essentially undiffracted, and those beams that are diffracted in second AOD 142 are absorbed by light absorber 145. Thus both the positive and the negative first order doppler shifted light beams, which are respectively p-polarized and s-polarized, exit second AOD 142 on colinear paths. Each combination of one positive and one negative first order doppler shifted light beam passing along the same path form an optical signal pair.

The first and second AODs are preferably adapted to be driven by microwave signals in the GHz band. Alternatively, AODs adapted to be driven by rf band signals can be used, with the output signal generated by the heterodyne detection of the doppler shifted optical signal pairs mixed up to the radar carrier.

Second AOD 142 is optically coupled to a beam expander 146, which in turn is optically coupled to a spatial light modulator (SLM) 147. SLM 147 typically comprises a two-dimensional array of liquid crystal pixels, the number of pixels in the array corresponding to the number of antenna elements driven by independent beamforming signals. Thus the total number of optical signal pair beams into which beam expander 146 must separate the light emerging from second AOD 142 is determined by the number of antenna elements or subarrays of antenna elements to be driven by optical signal processing system 150, and the two dimensional array in the spatial light modulator corresponds to the number and spatial arrangement of the optical signal pairs emerging from beam expander 146.

The two-dimensional liquid crystal array in SLM 147 advantageously comprises nematic liquid crystals (LCs); alternatively, ferro-electric liquid crystals or the like can be used. The liquid crystals are individually controlled to selectively adjust the phase of light beams having a predetermined linear polarization. By way of example and not limitation, the orientation of the LC directors in each LC cell is along the p-polarized beam, i.e., the same polarization orientation as light generated by laser source 132. Thus, only the +1 (the positive first order) diffracted p-polarized beam in each optical signal pair undergoes phaseshifts induced by the electrically controlled birefringence of the LC pixels in SLM 147, and the degree of the phase shift is selectively determinable by the control voltage applied to each pixel. Each LC pixel is separately controllable by array control computer 105, and analog control of the control voltage applied to the respective LC pixels allows analog control of the phase shift experienced by the p-polarized light beam in each optical signal pair. The −1 diffracted order (negative first order doppler shifted) s-polarized beam in each optical signal pair experiences only the ordinary index of refraction in the rotating LC molecules in each respective pixel, and therefore does not undergo a voltage-dependent phase shift when the control voltage on the LCs is changed.

SLM 147 is optically coupled to a beam-combining sheet polarizer 148 that is oriented at 45 degrees to the p- and s-polarization directions. This orientation of sheet polarizer 148 enables parallel components from the p- and s- beams in each optical signal pair to be combined. A two-dimensional lenslet array 149 is optically coupled to sheet polarizer 148 and disposed so that the plurality of phase-shifted light beams emanating from the different pixels in the two-dimensional LC array 147 are focussed into a 2-D single mode fiber array 170. A multi-fiber array link 171 is coupled to fiber array 170 and transceiver module 180 so as to carry the optical signals therebetween.

In accordance with this invention, transceiver module 180 comprises a heterodyne detection system for the optical signals, for example a photodiode array 182, and further comprises a transmit/receive signal coupler array 184 and a signal adder 186. Each fiber in multi-fiber optic array link 171 is terminated in a respective photodiode in photodiode array 182. Each photodiode detects the interference between the +1 and −1 doppler shifted beams of the respective optical signal pairs and generates a corresponding electrical beamforming signal. The heterodyne detection of the optical signal pairs causes the electrical beamforming signals generated by the photodiodes have a frequency that is twice the drive frequency of the AODs. Photodiode array 182 is electrically coupled to transmit/receive coupler array 184, which couples the respective beamforming signals to the antenna array in the transmit mode and combines the detected signals received from the antenna array in the receive mode with the desired beamforming signal to generate in-phase signals from each of the antenna elements to be added by signal adder 186.

Figure 2B:
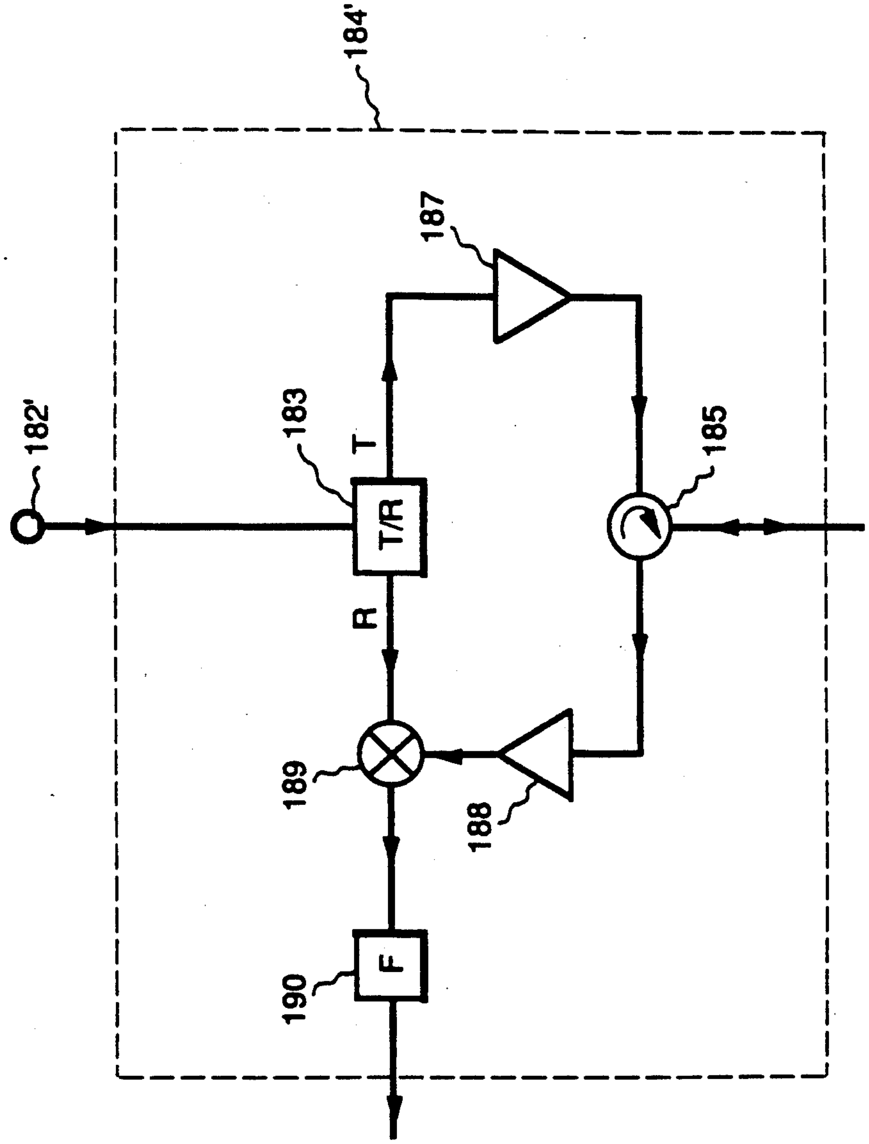
FIG. 2B is a part block and part schematic representation of a transceiver module in accordance with the present invention.

Transmit/receive (T/R) coupler array 184 comprises a plurality of channels to process signals for the respective antenna elements or subassemblies of elements. A representative channel 184' (for controlling one antenna element or subassembly of elements) of coupler array 184 is illustrated in FIG. 2B. Transmit/receive (T/R) coupler channel 184' comprises a T/R switch 183, a circulator 185, solid state amplifiers 187, 188, a mixer 189, and a filter 190. A photodiode 182' in photodiode array 182 (FIG. 2) is electrically coupled to T/R switch 183, which is controlled to selectively connect the electrical beamforming signal from photodiode 182' to either power amplifier 187 (in the transmit (T) mode) or to mixer 189 (in the receive (R) mode). In the transmit mode, the electrical beamforming signal is amplified in amplifier 187 and directed to the controlled antenna element (not shown) via circulator 185.

In the receive mode, the phased array antenna system is used to "view" a particular angle of space with respect to the antenna array to determine the intensity of electromagnetic radiation of the desired frequency being received from that direction. In a radar system, for example, the strength or intensity of the radiation received from a given angle determines whether a target is detected in that direction. The phase settings in SLM 147 in the optical processor determines the beam angle of the phased array antenna in either a transmit or a receive mode. Thus, in the receive mode, and with reference to FIG. 2B, the return signals detected in the antenna element coupled to T/R coupler channel 184' are directed through circulator 185 to low noise amplifier 188, and is mixed in mixer 189 with the reference electrical beamforming signal from photodiode 182'. This reference signal replicates the transmit control signal for each antenna element. Thus, on mixing the return and reference signals in mixer 189, the phase shifts cancel out, and in-phase baseband signals (alternatively, IF (intermediate frequency) band signals can be used) indicating the presence or absence of a return pulse at the selected angle with respect to the antenna are generated. Mixer 189 is coupled to electronic low-pass filter 190 (if IF band is used, filter 190 comprises an IF filter), through which the in-phase baseband (or IF) signal passes enroute to adder 186 (FIG. 2A). These in-phase baseband (or IF) signals generated from the detected return signals supplied by the antenna elements are added in microwave adder 186 to maximize the signal-to-noise ratio.

In operation, for each transmit/receive cycle, selected control voltages are set to control each pixel in spatial light modulator 147. Light beams of the appropriate polarization in each optical signal pair passing therethrough undergo a selected phase shift. The relative phase shifts in the plurality of optical signal pairs determine the direction in which a transmit pulse will emanate from the phased array antenna system, and the direction from which a return signal may be detected. In the transmit mode, T/R signal coupler array 184 is set so that each appropriately phase-shifted microwave signal generated by the photodiode array actuates the appropriate antenna element to generate the desired electromagnetic radiation pattern. In the receive mode, the same beamforming signals are mixed with the detected return signals from the antenna elements to generate an input for the post processing system for display and analysis. Use of relatively high ($\approx$50 V) nematic liquid crystal control voltages to control the spatial light modulator results in switching times of about 100 μsecs between respective transmit/receive sequences, providing approximately 1500 rpm rotation rates for the phased array. Such a rotation rate is about two orders of magnitude faster than typical mechanical scan rates. If necessary, faster scan times of about 200 beams/sec. or higher can be generated using the multi-channel time multiplexed beam scanning technique disclosed in the application Ser. No. 07/826,501, filed Jan. 27, 1992, cited above.

It will be readily understood by those skilled in the art that the present invention is not limited to the specific embodiments described and illustrated herein. Many variations, modifications and equivalent arrangements will now be apparent to those skilled in the art, or will be reasonably suggested by the foregoing specification and drawings, without departing from the substance or scope of the invention. Accordingly, it is intended that the invention be limited only by the spirit and scope of the appended claims.

What is claimed is:

1. A phased array antenna system comprising:
an antenna array including a plurality of antenna elements, said array being operable in a transmit or receive mode;
an optical signal processing system for generating optical control signals to determine transmit and receive electromagnetic radiation beam patterns of said antenna array, said optical signal processing system comprising:
acousto-optic means for generating optical output signals comprising a plurality of optical output signal pairs, each of said output signal pairs comprising a positive first order doppler-shifted light beam and a negative first order doppler-shifted light beam, and
an optical phase modulating device coupled to said acousto-optic means to selectively control relative phase between said positive and said negative first order doppler shifted light beams;
a transceiver module coupled to said optical signal processing system and to said antenna array and including heterodyne detection means for converting said optical output signal pairs to electrical beamforming signals for controlling the transmit and receive electromagnetic patterns of said antenna array; and
a source of coherent, polarized light optically coupled to said optical signal processing system.

2. The system of claim 1 wherein said acousto-optic means comprises:
a first and a second acousto-optic deflector (AOD), said first AOD being disposed to receive light beams from the light source and said second AOD being optically coupled to said optical phase modulating device; and
a 1:1 imaging system comprising a first and a second imaging lens and disposed so that light beams passing from said first AOD to said second AOD pass therethrough.

3. The system of claim 2 wherein:
said first AOD is disposed with respect to the light beams incident from said light source such that said light beams are Bragg matched to said first AOD and so that a portion of light passing therethrough is diffracted and undergoes a first order positive doppler shift, and the remaining portion of light passing through said first AOD is undiffracted, and
said second AOD is disposed with respect to said 1:1 imaging system so that the undiffracted light emerging from said first AOD is Bragg matched to said second AOD and undergoes a negative first order doppler shift and further so that a portion of said positive first order doppler shift light emerging from said first AOD passes through said second AOD undiffracted,
said second AOD being further positioned with respect to said imaging system so that respective positive and negative first order doppler shifted light beams emanate from said second AOD along collinear paths.

4. The system of claim 3 wherein said acousto-optic means further comprises a 90° polarization rotator disposed at the focal point between said first and second imaging lenses of said undiffracted light beams such that said undiffracted light beams emerging from said first AOD are orthogonally linearly polarized with respect to said diffracted beams emerging from said second AOD.

5. The system of claim 4 wherein said acousto-optic means further comprises a microwave source coupled to drive said first and second AODs with the same microwave drive signal.

6. The system of claim 5 wherein said optical phase modulating device comprises a liquid crystal spatial light modulator.

7. The system of claim 6 wherein said spatial light modulator comprises an array of nematic liquid crystal pixels.

8. The system of claim 7 further comprising:

a beam expander optically coupled between said second AOD and said spatial light modulator such that said positive and negative first order doppler shifted light beams will emerge from said beam expander in a plurality of optical signal pairs, each of said pairs comprising one positive and one negative first order doppler shifted optical signal;

a beam combining sheet polarizer optically coupled to said spatial light modulator and disposed to uniformly polarize each of said optical signal output pairs that emerge from said spatial light modulator;

a two-dimensional lenslet array optically coupled to said beam combining sheet polarizer; and a two-dimensional fiber optic array disposed to receive said optical signal output pairs from said lenslet array and to optically couple said signal output pairs to said transceiver module.

9. The system of claim 1 wherein said heterodyne detection means for converting optical output signal pairs to said electrical beamforming signals comprises a photodiode array.

10. The system of claim 7 wherein said transceiver module further comprises:

a photodiode array coupled to said two-dimensional fiber optic array for converting said optical signal pairs to said electrical beamforming signals;

a microwave mixer; and switching means for selectively supplying said electrical beamforming signals to said antenna array in the transmit mode and for supplying corresponding ones of said electrical beamforming signals and the return electromagnetic signals detected by said antenna elements to said microwave mixer in said receive mode.

11. The system of claim 10 wherein said switching means comprises a transmit/receive switch array coupled to said photodiode array for alternately directing said electrical beamforming signals to said antenna array and said microwave mixer.

12. The system of claim 11 wherein said light source comprises a laser.

13. A optical signal control system for producing differentially phase-shifted light beam pairs comprising:

a source of coherent, polarized light;

acousto-optic means for generating a plurality of optical signal pairs, each of said pairs comprising two light beams, one of said beams in each pair having a negative first order doppler shift and one of said beams in each pair having a positive first order doppler shift;

an optical phase modulating devide coupled to said acousto-optic means and disposed to selectively delay the phase of one light beam of a selected polarization in each of said optical signal pairs; and heterodyne means for detecting interference in each optical signal pair between said positive first order doppler shifted light beam and said negative first order doppler shifted light beam.

14. The system of claim 13 wherein said acousto optic means further comprises:

a first and a second acousto-optic deflector (AOD) driven by a common microwave signal;

a 1:1 imaging system disposed in the path of any light beams passing between said first and second AODs; and a 90° polarization rotator optically coupled to said imaging system and disposed so as to orthogonally polarize respective ones of said light beams in each of said optical signal pairs that exit said second AOD.

15. The system of claim 14 wherein said 1:1 imaging system comprises a first and a second imaging lens, said first and second lenses being disposed between said first and second AODs so that:

undiffracted light beams that emerge from said first AOD and pass through said first and second imaging lenses are Bragg matched to said second AOD so that a portion of said undiffracted light beams undergo a negative first order doppler shift in said second AOD; and the positive first order doppler shifted light beams that emerge from said first AOD and pass through said first and second imaging lenses are Bragg matched to said second AOD so that a portion of said positive first order light beams emerge from said second AOD undiffracted and on a colinear path with said negative first order doppler shifted beams.

16. The system of claim 15 wherein said 90° polarization rotator is disposed at the focal point between said first and second lenses of the undiffracted light beams emerging from said first AOD.

17. The system of claim 16 wherein said optical phase modulating device comprises a liquid crystal spatial light modulator (SLM) having a two-dimensional array of pixels, said SLM being disposed so that each of said optical signal pairs that emerge from said second AOD pass through a respective one of said pixels.

18. The system of claim 17 wherein said heterodyne means for detecting interference comprises an array of photodiodes, each respective one of said photodiodes being coupled to receive a respective one of said optical signal pairs from said spatial light modulator, each respective one of the photodiodes in said array corresponding to a respective one of said pixels in said spatial light modulator.

19. A method processing optical signals to control a phased array antenna having a plurality of antenna elements, comprising the steps of:

passing a plurality of coherent, polarized light beams through an acousto-optic system to generate a plurality of optical signal pairs, each of said pairs comprising two light beams, one of said light beams having a positive first order doppler shift and one of said light beams having a negative first order doppler shift;

in each of said optical signal pairs, selectively shifting the phase of a predetermined one of said light beams with respect to the other;

detecting interference between the relative phases of the positive and negative first order doppler shifted light beams in each of said optical signal pairs and generating an electrical beamforming signal corresponding to the detected interference for each of said optical signal pairs; and controlling the transmit and receive electromagnetic radiation patterns of said phased array antenna with said electrical beamforming signals.

20. The method of claim 19 further comprising the step of shifting the polarization of selected ones of said light beams passing through said acousto-optic system so that in each of said optical signal pairs the light beams are orthogonally linearly polarized.

21. The method of claim 20 wherein the step of passing said plurality of light beams through an acousto-optic system further comprises the steps of:

directing said plurality of light beams onto a first acousto-optic deflector (AOD) at the Bragg angle of said first AOD to generate an undiffracted set of light beams and a positive first order doppler shifted set of light beams passing from said first AOD;

directing said set of undiffracted light beams onto a second AOD at a Bragg angle so as to generate a negative first order doppler shifted set of light beams, said first and second AODs being driven by a common drive frequency; and directing said positive first order doppler shifted set of light beams onto said second AOD at a Bragg angle therefor so that the majority of the positive first order diffracted beams pass through undiffracted, respective ones of said positive and said negative first order doppler shifted light beams passing from said second AOD being coincident with one another to form said optical signal pairs.

22. The method of claim 21 wherein the step of directing said undiffracted and said positive first order doppler shifted light beams onto said second AOD comprises passing said light through a 1:1 imaging system disposed between said first and second AODs, said imaging system comprising a first and second imaging lens.

23. The method of claim 22 wherein the step of shifting the polarization of selected ones of said light beams passing through said acousto-optic system comprises passing said undiffracted set of light beams through a 90° polarization rotator disposed at the focal point between said first and second imaging lenses.

24. The method of claim 23 wherein the step of detecting interference between relative phases of light beams in said optical signal pairs comprises directing respective ones of said optical signal pairs into corresponding photodiodes arranged in an array and generating a plurality of respective electrical beamforming signals.

25. The method of claim 24 further comprising the step of adjusting the frequency of said electrical beamforming signals by altering the drive frequency of said first and second AODs.

* * * * *